United States Patent
Butterbach et al.

(10) Patent No.: US 6,228,456 B1
(45) Date of Patent: May 8, 2001

(54) HOT-MELT ADHESIVE FOR GLUING DIGITAL VERSATILE DISCS

(75) Inventors: Ruediger Butterbach, Essen; Ulrike Maassen, Neuss; Siegfried Kopannia, Krefeld, all of (DE); Jean Louis Requin, Estaires (FR)

(73) Assignee: Henkel Kommanditgesellschaft auf Aktien

( * ) Notice: Subject to any disclaimer, the term of this patent is extended or adjusted under 35 U.S.C. 154(b) by 0 days.

(21) Appl. No.: 09/380,863

(22) PCT Filed: Mar. 3, 1998

(86) PCT No.: PCT/EP98/00179

§ 371 Date: Sep. 9, 1999

§ 102(e) Date: Sep. 9, 1999

(87) PCT Pub. No.: WO98/40883

PCT Pub. Date: Sep. 17, 1998

(30) Foreign Application Priority Data

Mar. 12, 1997 (DE) .............................. 197 10 115

(51) Int. Cl.$^7$ ..................................... B32B 3/02
(52) U.S. Cl. ............. 428/64.1; 428/64.1; 428/64.4; 428/65.2; 428/457; 428/913; 430/270.11; 430/495.1; 430/945; 869/283; 869/288; 156/326
(58) Field of Search ............ 428/64.1, 64.2, 428/64.4, 65.2, 457, 913; 430/270.11, 495.1, 945; 369/283, 288; 156/325, 326

(56) References Cited

U.S. PATENT DOCUMENTS

| | | | |
|---|---|---|---|
| 4,503,531 | 3/1985 | Kato | 369/275 |
| 5,077,120 | 12/1991 | Kato et al. | 428/200 |
| 5,128,388 | 7/1992 | Komori et al. | 522/95 |
| 5,227,213 | 7/1993 | Komori et al. | 428/64 |
| 5,290,877 | * 3/1994 | Yamaoka et al. | 525/329.5 |
| 5,512,625 | 4/1996 | Butterach et al. | 524/490 |

FOREIGN PATENT DOCUMENTS

| | | |
|---|---|---|
| 32 24 647 | 2/1983 | (DE) . |
| 32 46 857 | 7/1983 | (DE) . |
| 3246857 | * 7/1983 | (DE) . |
| 3840391 | * 6/1989 | (DE) . |
| 38 40 391 | 6/1989 | (DE) . |
| 42 26 081 | 2/1994 | (DE) . |
| 0 243 976 | 11/1987 | (EP) . |
| 0243976 | * 11/1987 | (EP) . |
| 0 735 530 | 10/1996 | (EP) . |
| 0735530 | * 10/1996 | (EP) . |
| 0 844 608 | 5/1998 | (EP) . |
| 0844608 | * 5/1998 | (EP) . |
| 63-023239 | 1/1988 | (JP) . |

OTHER PUBLICATIONS

Patent Abstracts of Japan, vol. 12, No. 231, (Asahi Chemical Ind. Co. Ltd), Jun. 1988.*
Patent Abstracts of Japan, vol. 012, No. 231 (1988).

* cited by examiner

Primary Examiner—Elizabeth Evans
(74) Attorney, Agent, or Firm—Wayne C. Jaeschke; Stephen D. Harper

(57) ABSTRACT

Hotmelt adhesives with a melt viscosity of >100,000 mPas at 160° C. are suitable for bonding substrate halves in the production of digital versatile discs (DVDs) and afford major process-related advantages over known UV-curing adhesives. In their pigmented embodiment, they are able to combine the three functions of adhesive bonding, protecting the metallic reflection layer against corrosion and forming a covering background for a text/graphics layer.

20 Claims, 1 Drawing Sheet

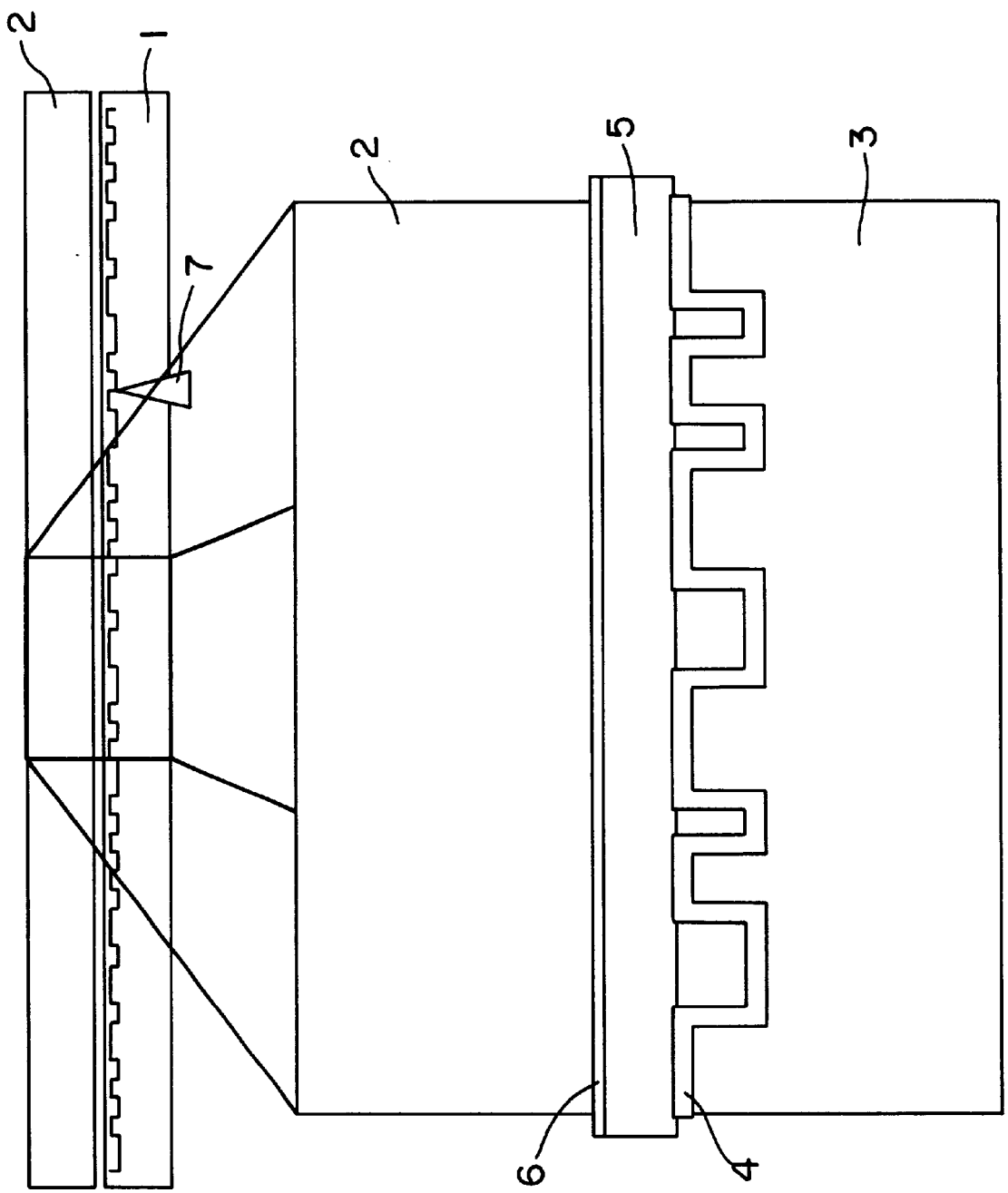

HOT-MELT ADHESIVE FOR GLUING DIGITAL VERSATILE DISCS

BACKGROUND OF THE INVENTION

1. Field of the Invention

This invention relates to hotmelt adhesives for bonding DVDs which have a sandwich-like structure and to a process for the production of such DVDs.

2. Discussion of the Related Art

DVD is the abbreviation for digital versatile discs or digital video discs. These are optical storage media similar to the known compact disc (CD). The main difference between DVDs and CDs is the considerably higher density of musical information, graphic information or data stored on DVDs. This higher data or information density of the storage medium imposes greater demands on the production process and the materials used therein.

One possible construction of a DVD is schematized in FIG. 1 which shows a so-called "DVD 5". This DVD consists essentially of two halves, it is one-sided, carries one layer of information and has a storage capacity of 4.7 gigabytes. In FIG. 1, the information-carrying layer is denoted by the reference 1 while the information-free top layer is denoted by the reference 2. The laser beam needed to scan the information is denoted by the reference 7.

Accordingly, the structure of a DVD differs from that of the standard CD (compact disc) in that the DVD has a sandwich construction. Whereas CDs consist essentially of a 1.2 mm thick disc of polycarbonate or (poly)methacrylate resin, DVDs are made from two 0.6 mm thick discs. Today, polycarbonate is almost exclusively used for these discs. A refined data structure coupled with a laser of short wavelength enables one information layer of a DVD to carry around 4.7 gigabytes of information compared with the 680 megabytes of information carried by a standard CD.

The sandwich construction of DVDs means that the two layers 1 and 2 have to be joined together. Originally, solvent-based adhesives were used to bond the two layers. More recently, hotmelts, UV-curable solventless liquid adhesives and UV-crosslinkable hotmelt adhesives have been proposed.

The production of a DVD essentially involves the following crucial steps:

The polycarbonate or poly(meth)acrylate blanks have to be produced by injection molding.

The blank 1, which carries the layer of information, is coated with a reflective layer—generally a metal layer, for example of aluminium, applied by vapor deposition.

This reflective layer has to be protected against corrosion immediately after production. In one known embodiment, therefore, a lacquer film cured by UV radiation is applied to the reflective layer. An alternative method is to apply a protective film of a thermoplastic material.

The information-free blank 2 can be printed with graphics and text by various methods.

The blanks 1 and 2 are bonded together with an adhesive. DE-A-32 24 647 describes a process for the production of optical video discs and digital audio discs. In this process, the information-carrying layer, after coating with a reflective film of aluminium, is provided with a protective film of a hot-melting film-forming material which melts at a predetermined temperature and hardens at room temperature. In one embodiment, the hot-melting film-forming material is also the adhesive for joining the two disc substrate halves. In another embodiment, the film-forming material is coated with another adhesive which is tacky at room temperature. The two disc substrates are joined together with this adhesive. DE-A-32 24 647 does not mention anything about the composition of the hot-melting film-forming material or the adhesive tacky at room temperature. In addition, there is nothing in the teaching of DE-A-32 24 647 to indicate whether these adhesive materials are also suitable for the production of DVDs.

DE-A-32 46 857 describes an optical disc comprising a pair of substrates of which at least one has information "pits" formed on one surface. A metallic layer of a reflective film is applied to the layer of information pits while a protective resin layer is applied to the metallic reflective layer. The protective resin layer carries a layer of adhesive by which the two substrate halves are joined together. According to DE-A-32 46 857, the adhesive is selected from hotmelt adhesives containing a mixture of one or more thermoplastic elastomers as the basic polymer. In addition, it is clear from the teaching of DE-A-32 46 857 that the hotmelt adhesives described therein contain standard tackifying resins and additives, for example fillers, antioxidants or UV absorbers, to increase their resistance to heat and weathering. It is also stated that the melt viscosity of the adhesive should not exceed a value of 1,000 poises at 160° C. so that the adhesive does not have any adverse effects on the vapor-coated metallic film. Nothing is said about the suitability of these adhesives for the production of DVDs.

According to the teaching of DE-A-38 40 391, the use of hotmelt adhesives in the bonding of substrate pairs for the production of video discs and digital audio discs is problematical on account of their poor thermal stability. According to this teaching, the use of UV-curable monomer compositions as adhesive can cause corrosion of the substrate. DE-A-38 40 391 proposes the use of UV-cosslinkable hotmelt adhesives for bonding the substrate pairs in the production of video discs. Nothing is said about the suitability of these UV-crosslinkable hotmelt adhesives for the production of DVDs.

As mentioned at the beginning, DVDs are distinguished from CDs and optical discs (also known as laser discs) by a higher data or information density of the storage medium so that they impose more stringent demands on the production process and the materials used therein, for example adhesives. UV-curing adhesives tend to undergo adhesion failures, for example under impact, because they are generally very brittle after curing. Similarly, most UV-curing adhesives and other reaction adhesives undergo relatively high natural shrinkage. The resulting force applied by the adhesive to the reflection layer can have an adverse effect on the information content and the operational reliability of the DVD.

SUMMARY OF THE INVENTION

Against the background of this prior art, the problem addressed by the present invention was to provide an adhesive that would enable DVDs to be economically produced without having any of the disadvantages of UV-curing adhesives and known hotmelt adhesives.

The solution to this problem as provided by the invention is defined in the claims and lies essentially in the use of a hotmelt adhesive with a melt viscosity of at least 100,000 mPas as measured in accordance with ASTM D 3632 at 160° C.

In one particularly preferred embodiment, the invention relates to the use of a colored or pigmented hotmelt adhesive which is capable of performing three functions, namely:

reliable bonding of the two substrate halves corrosion control for the reflective (metal) layer so that there is no need to apply a separate anti-corrosion layer to the reflective layer the pigmented hotmelt adhesive may additionally serve as a covering and contrast-increasing background for a printed text/graphics layer applied as a mirror image to the substrate layer 2 so that there is no need to apply another covering background graphic.

BRIEF DESCRIPTION OF THE DRAWINGS

FIG. 1 illustrates in cross-section a digital video disc comprised of two blanks.

FIG. 2 shows an enlarged cross-section of a DVD prepared in accordance with the present invention.

The hotmelt adhesives to be used in accordance with the invention consist of the following components known per se: thermoplastic polymeric binder, tackifying resins, optionally plasticizers, stabilizers/antioxidants, optionally fillers or extenders and—for the preferred embodiment—pigments and/or optionally soluble dyes.

Suitable polymeric binders are thermoplastic elastomers, polyamides, ethylene copolymers, polyolefins and polyesters with a high amorphous component. Examples of thermoplastic elastomers are thermoplastic polyurethanes (TPU) which are generally based on aromatic diisocyanates; particularly suitable are block copolymers of the A-B, A-B-A, A-(B-A)$_n$-B and (A-B)$_n$-Y type, where A is an aromatic polyvinyl block and the block B comprises a rubber-like middle block which may be partly hydrogenated. Examples of such block copolymers contain a polystyrene block as A and a substantially rubber-like polybutadiene or polyisoprene block B; Y can be a polyfunctional compound and n is an integer of at least 3. To improve thermal stability, the middle block B (i.e. the polybutadiene or polyisoprene block) may optionally be partly hydrogenated so that the double bonds originally present are at least partly removed. Block copolymers such as these are also available from various manufacturers as S-B-S (styrene-butadiene-styrene) copolymers or as S-I-S (styrene-isoprene-styrene) copolymers and as S-E-B-S (styrene-ethylene-butadiene-styrene) copolymers.

Suitable polyamides are the condensation products of dimerized fatty acids and polyamines which are available from Henkel KGaA under the names of "Macromelt" and "Reamide". Suitable ethylene copolymers are the following ethylene/vinyl acetate copolymers, ethylene/ethyl acrylate copolymers, ethylene/methyl acrylate, ethylene/methyl methacrylate or ethylene/ethyl methacrylate copolymers known as a raw-material base for hotmelt adhesives and also copolymers or terpolymers of ethylene with other olefinically unsaturated monomers. Examples of polyolefins are polyisobutene and the largely amorphous poly-α-olefins which are synthesized from the monomers ethylene, propylene and/or butylene or isobutylene and optionally other olefinically unsaturated monomers.

It is known that tackifying resins are added to increase the tackiness of the melt, particularly at the application temperature, and to strengthen adhesion. Examples of tackifying resins which may be used in the adhesive compositions to be employed in accordance with the invention are colophony derivatives, tall oil, tall oil derivatives, colophony ester resins, natural and synthetic terpenes, terpene-phenol resins and aliphatic, aromatic or mixed aliphatic/aromatic tackifying hydrocarbon resins.

The plasticizers to be used are essentially determined by the polymer component used. Examples of plasticizers are process oils, more particularly naphthenic process oils, paraffin oils, castor oil, low molecular weight polybutenes or polyisobutylenes or polyisoprenes and dialkyl or alkylaryl esters of phthalic acid.

The stabilizers or antioxidants used to reduce oxidative degradation may be selected from the many commercially available antioxidants. Examples include sterically hindered phenols and/or thioethers and the like. It can be of advantage to combine two or more antioxidants differing in their chemical composition and to obtain particularly good stability.

The polyolefin-based heat-resistant hotmelt adhesives with impact strength at low temperatures disclosed in DE-A-42 26 081 are suitable for the use according to the invention and, accordingly, are expressly an integral part of the present invention.

For the preferred embodiment where they are used for the production of DVDs, the hotmelt adhesives contain pigments, particularly white pigments and more particularly titanium dioxide. However, other colored pigments, for example based on iron oxides, may be used—optionally in combination with titanium dioxide—to obtain other colored backgrounds. Soluble dyes may also be used, optionally in combination with pigments.

The use of the hotmelt adhesive according to the invention, including the key steps involved, is described in more detail in the following with reference to FIG. 2.

1. The two substrate blanks which today consist essentially of polycarbonate are made by injection molding.
2. The substrate half 3, which has received the information layer in the form of pits in the injection molding process, is coated with a reflective layer. This is generally a metallic layer, for example of aluminium, which is applied by vapor deposition.
3. The substrate half 2, which does not contain an information layer, can be printed on the inside with graphics or text by various methods. For example, the inside can be provided with a multicolor mirror-image print.
4. Both the substrate half 3 which is provided with the metal layer 4 and which carries the information layer and the substrate half 2 which optionally contains the printed graphic 6 are coated with the hotmelt adhesive (5). The two substrate halves are then joined together to form the complete DVD.

The hotmelt adhesives to be used in accordance with the invention are applied to the substrate halves, generally by roller, in a layer thickness of 30 μm or more, normally at temperatures of at least 140° C. and preferably 160° C. The high melt viscosities of >100,000 mPas have proved to be of considerable advantage in this regard because the hotmelt adhesive can be cleanly applied, even at the very high processing speeds necessary, without going beyond the outer edges of the DVD. In addition, stringing of the adhesive is avoided at these high viscosities. The hotmelt adhesives also have very high cohesion so that the DVD thus produced is able to recover fully and rapidly after being bent in use or during handling.

The use of the hotmelt adhesives according to the invention affords the following further advantages over known UV-curing adhesives:

Hotmelt adhesives are more economical by a factor of at least 4. The applicators for hotmelt adhesives are also less expensive than the equipment required for applying UV-curing systems.

The adhesives can be colored or pigmented, creating many possibilities in regard to the design of the DVD.

Hotmelt adhesives show good adhesion behavior, particularly under impact, especially at low temperatures.

Hotmelt adhesives are better able to even out any inaccuracies or dimensional differences in the polycarbonate substrates.

Normally, no waste accumulates during the processing of hotmelt adhesive.

No health-damaging gases, for example ozone, or monomer vapors occur.

In the event of product changes or production stoppages, no difficulties are involved in disposing of residual hotmelt adhesives. In small quantities, the residues may be disposed of in much the same way as domestic refuse.

What is claimed is:

1. A digital video disc comprising:
    (a) a first blank containing an information layer;
    (b) a light-reflecting metal layer coated on said information layer;
    (c) a second blank containing a printed graphics/text layer; and
    (d) a layer of a hotmelt adhesive between the light-reflecting metal layer coated on the first blank and the printed graphics/text layer coated on the second blank, wherein said hotmelt adhesive has a melt viscosity of at least 100,000 mPas at 160° C., as measured in accordance with ASTM D 3632, and comprises at least one soluble dye or pigment;

wherein said layer of hotmelt adhesive provides corrosion control for the light-reflecting metal layer and serves as a covering and contrast-increasing background for said printed graphics/text layer.

2. The digital video disc of claim 1 wherein the first blank and second blank are both comprised of polycarbonate.

3. The digital video disc of claim 1 wherein the hotmelt adhesive is comprised of at least one thermoplastic polymeric binder selected from the group consisting of polyamides, thermoplastic polyurethanes, ethylene copolymers, polyolefins and block copolymers comprised of at least one aromatic polyvinyl block and at least one rubber-like block.

4. The digital video disc of claim 1 wherein the layer of hotmelt adhesive has a thickness of at least 30 μm.

5. The digital video disc of claim 1 wherein said pigment comprises titanium dioxide.

6. A process for producing a digital video disc comprised of a first blank containing an information layer and a light-reflecting metal layer and second blank containing a printed graphics layer, said process comprising a step of bonding the first blank and the second blank with a layer of a hotmelt adhesive with a melt viscosity of at least 100,000 mPas at 160° C., as measured in accordance with ASTM D 3632, and comprising at least one soluble dye or pigment, wherein said layer of hotmelt adhesive provides corrosion control for the light-reflecting metal layer and serves as a covering and contrast-increasing background for said printed graphics text layer.

7. The process of claim 6 wherein the hotmelt adhesive is comprised of at least one thermoplastic polymeric binder selected from the group consisting of polyamides, thermoplastic polyurethanes, ethylene copolymers, polyolefins, polyesters, and block copolymers comprised of at least one aromatic polyvinyl block and at least one rubber-like block.

8. The process of claim 7 wherein the hotmelt adhesive is additionally comprised of at least one constituent selected from the group consisting of tackifying resins, plasticizers, coupling agents, stabilizers/antioxidants and fillers.

9. The process of claim 6 wherein the hotmelt adhesive is comprised of a white pigment.

10. The process of claim 9 wherein the white pigment is titanium dioxide.

11. The process of claim 6 wherein the light-reflecting metal layer is comprised of aluminum.

12. The process of claim 6 wherein the layer of hotmelt adhesive has a thickness of 30 μm or more.

13. A process for producing a digital video disc, comprising the steps of:
    (a) applying an information layer to a first blank;
    (b) coating the information layer applied to said first blank with a light-reflecting metal layer;
    (c) coating the light-reflecting metal layer with a layer of a hotmelt adhesive with a melt viscosity of at least 100,000 mPas at 160° C., as measured in accordance with ASTM D 3632, and comprising at least one soluble dye or pigment;
    (d) bonding the first blank to a second blank containing a printed graphics or text layer using the layer of hotmelt adhesive applied in step (c).

14. The process of claim 13 wherein the second blank is also coated with a layer of hotmelt adhesive prior to step (d).

15. The process of claim 13 wherein the first blank and second blank are both comprised of polycarbonate.

16. The process of claim 13 wherein the light-reflecting metal layer is comprised of aluminum and is applied by vapor deposition.

17. The process of claim 13 wherein the layer of hotmelt adhesive is applied to the light-reflecting metal layer on the first blank at a temperature of at least 140° C.

18. The process of claim 13 wherein the hotmelt adhesive is comprised of at least one thermoplastic polymeric binder selected from the group consisting of polyamides, thermoplastic polyurethanes, ethylene copolymers, polyolefins, polyesters, block copolymers comprised of at least one aromatic polyvinyl block and at least one rubber-like block and at least one additional constituent selected from the group consisting of tackifying resins, plasticizers, coupling agents, stabilizers/antioxidants and fillers.

19. The process of claim 13 wherein the hotmelt adhesive is comprised of a white pigment.

20. The process of claim 13 wherein the layer of hotmelt adhesive is applied by roller.

* * * * *

UNITED STATES PATENT AND TRADEMARK OFFICE
CERTIFICATE OF CORRECTION

PATENT NO. : 6,228,456 B1
DATED : May 8, 2001
INVENTOR(S) : Butterbach et al.

It is certified that error appears in the above-identified patent and that said Letters Patent is hereby corrected as shown below:

<u>Title page,</u>
Item [73], Assignee:, after "Aktien", insert therefor -- , Duesseldorf (DE) --.

Signed and Sealed this

Sixth Day of July, 2004

JON W. DUDAS
*Acting Director of the United States Patent and Trademark Office*